United States Patent
Park

(10) Patent No.: US 7,474,362 B2
(45) Date of Patent: Jan. 6, 2009

(54) LIQUID CRYSTAL DISPLAY DEVICE AND METHOD OF FABRICATING THE SAME

(75) Inventor: Yong In Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 577 days.

(21) Appl. No.: 11/166,161

(22) Filed: Jun. 27, 2005

(65) Prior Publication Data

US 2006/0132665 A1    Jun. 22, 2006

(30) Foreign Application Priority Data

Dec. 22, 2004   (KR)   ...................... 10-2004-0110675

(51) Int. Cl.
G02F 1/136   (2006.01)
G02F 1/1343   (2006.01)
H01L 27/14   (2006.01)

(52) U.S. Cl. .................... 349/42; 349/43; 349/147; 257/72

(58) Field of Classification Search .................... 349/42, 349/147, 148, 43; 438/30; 257/72, 59, 351
See application file for complete search history.

(56) References Cited

U.S. PATENT DOCUMENTS

| | | | |
|---|---|---|---|
| 5,212,574 A * | 5/1993 | Katayama et al. ............. | 349/38 |
| 6,403,409 B1 | 6/2002 | You | |
| 6,451,630 B2 | 9/2002 | Lee | |
| 6,617,203 B2 | 9/2003 | Kim et al. | |
| 6,753,235 B2 | 6/2004 | So et al. | |
| 7,235,850 B2 * | 6/2007 | Koo et al. .................... | 257/408 |
| 2001/0025958 A1 * | 10/2001 | Yamazaki et al. ............. | 257/72 |
| 2002/0187574 A1 * | 12/2002 | Moon et al. ................... | 438/30 |
| 2004/0086807 A1 * | 5/2004 | Peng et al. ................... | 430/317 |

FOREIGN PATENT DOCUMENTS

| | | |
|---|---|---|
| KR | 1019970003717 B1 | 3/1997 |
| KR | 1019970008589 B1 | 5/1997 |
| KR | 1019970011966 B1 | 8/1997 |
| KR | 100161461 B1 | 8/1998 |
| KR | 0175408 | 2/1999 |
| KR | 0177785 | 3/1999 |
| KR | 0184509 | 4/1999 |
| KR | 10-0192593 | 7/1999 |
| KR | 1020000025565 A | 5/2000 |
| KR | 1020000026894 A | 5/2000 |
| KR | 1020000026895 A | 5/2000 |
| KR | 1020000031451 A | 6/2000 |
| KR | 1020000041223 A | 7/2000 |
| KR | 1020000075031 A | 12/2000 |
| KR | 1020010019665 A | 3/2001 |
| KR | 1020010019668 A | 3/2001 |

(Continued)

*Primary Examiner*—Mike Qi
(74) *Attorney, Agent, or Firm*—McKenna Long & Aldridge LLP

(57) ABSTRACT

Disclosed are liquid crystal display devices having an integrated driving circuit allowing a large area panel to be manufactured. This is achieved through low resistance wiring by forming a second gate wiring with a clad structure on top of a first gate wiring of low resistance without additional mask process.

35 Claims, 6 Drawing Sheets

FOREIGN PATENT DOCUMENTS

| | | |
|---|---|---|
| KR | 100297706 B1 | 5/2001 |
| KR | 1020010054739 A | 7/2001 |
| KR | 1020010055071 A | 7/2001 |
| KR | 1020010056037 A | 7/2001 |
| KR | 1020010110917 A | 12/2001 |
| KR | 1020020009188 A | 2/2002 |
| KR | 1020020022258 A | 3/2002 |
| KR | 1020020071061 A | 9/2002 |
| KR | 1020020071062 A | 9/2002 |
| KR | 1020020074897 A | 10/2002 |
| KR | 1020020078116 A | 10/2002 |
| KR | 1020020079196 A | 10/2002 |
| KR | 1020020080202 A | 10/2002 |
| KR | 1020030006619 A | 1/2003 |
| KR | 1020030030286 A | 4/2003 |

* cited by examiner

LIQUID CRYSTAL DISPLAY DEVICE AND METHOD OF FABRICATING THE SAME

This application claims the benefit of Korean Patent Application No. 2004-110675, filed on Dec. 22, 2004, which is hereby incorporated by reference for all purposes as if fully set forth herein.

BACKGROUND OF THE INVENTION

1. Field of the Invention

The present invention relates to a liquid crystal display device and a method of fabricating the same, and more particularly, to a driving circuit integrated type liquid crystal display device, in which a large area panel can be manufactured by realizing a low resistance wiring, and a method of fabricating the same.

2. Discussion of the Related Art

Recently, displays are considered to be more and more important as a visual information transmission media. In order to occupy a major position in the future, the display has to satisfy a low power consumption characteristic, a thin and light characteristic, and a high picture quality characteristic. Because a liquid crystal display (LCD) device (a popular type of flat panel display (FPD)) not only satisfies these requirements but also allows for mass production. Thus, various kinds of new products using the LCD device are being developed, and the LCD device has become the leading replacement of the existing cathode ray tube (CRT) technology.

Generally, a liquid crystal display device is a display device for displaying desired images by supplying data signals corresponding to image information to liquid crystal cells arranged in a matrix, respectively, and controlling the light transmittance of the liquid crystal cells.

The Active Matrix (AM) method, the primary driving method for the liquid crystal display device, is a method that drives liquid crystal in a pixel portion using an amorphous silicon thin film transistor (a-Si TFT) as a switching device.

The concept of amorphous silicon thin film transistor technology was established by LeComber, United Kingdom et al. in 1979, and put into practical use as a 3-inch liquid crystal portable television in 1986. Recently, a large area thin film transistor liquid crystal display devices larger than 50 inches have been developed. In particular, the amorphous silicon thin film transistor is actively used since a glass substrate of a low price is useable because a low temperature process is available.

However, there are limitations on using the amorphous silicon thin film transistor for a peripheral circuit requiring high speed operation greater than 1 MHz by an electric mobility of 0 to 1 cm2/Vsec of the amorphous silicon thin film transistor. Accordingly, the study of integrating both the pixel portion and the driving circuit portion on a glass substrate using polycrystalline silicon (poly-Si) thin film transistors having a field effect mobility greater than amorphous silicon thin film transistors is being actively pursued.

The polycrystalline silicon thin film transistor technology has been adapted to a small-size module of a camcorder or the like since the liquid crystal display color television was developed in 1982. It has an advantage that a driving circuit can be manufacture directly on a substrate because of a low photosensitivity and a high field effect mobility.

An increase in the mobility can improve the operational frequency of the driving circuit portion for determining the number of driving pixels, and this makes it easier to achieve the high definition of a display device. Further, a picture quality improvement can be anticipated because the distortion of a transmission signal is reduced by a reduction in the charging time of a signal voltage of the pixel portion.

Furthermore, the polycrystalline silicon thin film transistor has an advantage that power consumption can be reduced because it can be driven at less than 10V as compared to the amorphous silicon thin film transistor having a high driving voltage of 0 to 25V.

Hereinafter, a structure of a liquid crystal display device will be described in detail with reference to the accompanying drawings.

FIG. 1 is a plan view schematically illustrating a structure of a related art liquid crystal display device, in which a driving circuit integrated type liquid crystal display device having a driving circuit portion integrated on an array substrate is illustrated.

As illustrated therein, the liquid crystal display device largely comprises a color filter substrate 5, an array substrate 10, and a liquid crystal layer (not illustrated) formed between the color filter substrate 5 and the array substrate 10.

The array substrate 10 includes a pixel portion 35, an image display region in which unit pixels are arranged in a matrix, and a driving circuit portion 30 located at the periphery of the pixel portion 35 and having of a data driving circuit portion 31 and a gate driving circuit portion 32.

Though not illustrated in the drawings, the pixel portion 35 of the array substrate 10 includes a plurality of gate lines and a plurality of data lines that define a plurality of pixel regions by being arranged vertically and horizontally on the substrate 10, a plurality of thin film transistors serving as switching devices formed at intersections of the gate lines and the data lines and a plurality of pixel electrodes formed in the pixel regions.

The thin film transistor is a kind of field effect transistor (FET) serving as a switching device for applying and intercepting a signal voltage to and from the pixel electrodes which controls the flow of an electrical current by an electric field.

The driving circuit portion 30 of the array substrate 10 is located at the periphery of the pixel portion 35 of the array substrate 10 protruded on the color filter substrate 50. The data driving portion 31 is located at a long side of the protruded array substrate 10, and the gate driving circuit portion 32 is located at a short side of the protruded array substrate 10.

The data driving circuit portion 31 and the gate driving circuit portion 32 use a thin film transistor of a CMOS (Complementary Metal Oxide Semiconductor) structure, which is an inverter, in order to properly output an input signal.

For reference, the CMOS is a kind of integrated circuit of a MOS structure used for driving circuit portion thin film transistors that require high speed signal processing. The CMOS requires both N channel thin film transistors and P channel thin film transistors, and its speed and density characteristics exhibit an intermediate form between a NMOS and a PMOS.

The gate driving circuit portion 32 and the data driving circuit portion 31 are an apparatus for supplying scanning signals and data signals to the pixel electrodes via the gate lines and data lines, respectively. They are connected to an external signal input terminal (not illustrated) and thus serve to control an external signal coming through the external signal input terminal and output it to the pixel electrodes.

A color filter (not illustrated) for implementing colors and a common electrode facing the pixel electrodes formed on the array substrate 10 are formed at the pixel portion 35 of the color filter substrate 5.

The color filter substrate 5 and array substrate 10 constructed as above are provided with a cell gap therebetween so as to be regularly spaced apart from each other, and face each other and are attached by a seal pattern (not illustrated) formed on an outer edge of the pixel portion 35, thereby forming a unit liquid crystal display panel. The attachment of the two substrates 5 and 10 is formed through an attachment key (not illustrated) formed at the color filter substrate 30 or the array substrate 10.

Gate wiring and data wiring are means for applying scanning signals and data signals, respectively, and required to suppress a signal delay and disconnection.

In particular, material used for the wirings should have a specific resistance less than a predetermined level, should not be easily oxidized, and should not be easily broken in the fabricating process.

However, current technologies are unable to efficiently implement a large area liquid crystal display panel requiring a low resistance wiring.

SUMMARY OF THE INVENTION

Accordingly, the present invention is directed to liquid crystal display device and method of fabricating the same that substantially obviates one or more of the problems due to limitations and disadvantages of the related art.

The present invention is directed to overcome the above problems and it is an advantage of the present invention to provide a liquid crystal display device, by which a large area panel with a low resistance wiring can be manufactured by forming a second gate wiring of a clad structure on the top of a first gate wiring of low resistance, and a method of fabricating the same.

It is another advantage of the present invention to provide a driving circuit integrated type liquid crystal display device, which has cost competitiveness by realizing a low resistance wiring without an additional mask process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of fabricating a liquid crystal display device according one aspect of the present invention, comprising: providing a substrate having a first region and a second region; forming active patterns in the first and second regions; forming a first insulating film on the substrate; forming a first gate electrode of a first conductive material on the active patterns; forming a second gate electrode of a second conductive material on the first gate electrode of the first region and forming source and drain regions of N type on the active pattern of the first region; forming a second gate electrode of the second conductive material on the first gate electrode of the second region and forming source and drain regions of P type on the active pattern of the second region; forming a second insulating film on the substrate; and forming N type source and drain electrodes electrically connecting to the N type source and drain regions in the first region and P type source and drain electrodes electrically connecting to the P type source and drain regions in the second region.

There is provided a method of fabricating a liquid crystal display device according to a further aspect of the present invention, comprising the steps of: providing a substrate having a pixel region and a driving circuit region, the driving circuit region having a first area and a second area; forming active patterns in the pixel and driving circuit regions; forming a first insulating film on the substrate; forming a first gate electrode of a first conductive material on the active pattern; forming a second gate electrode of a second conductive material on the first gate electrode of the pixel region and the first area of the driving circuit region and forming source and drain regions of N type on the active patterns of the pixel region and the first area of the driving circuit region; forming a second gate electrode of a second conductive material on the first gate electrode of the second area of the driving circuit region and forming source and drain regions of P type on the active pattern of the second area of the driving circuit region; forming a second insulating film on the substrate; and forming N type source and drain electrodes electrically connecting to the N type source and drain regions in the pixel region and the first area of the driving circuit region and forming P type source and drain electrodes electrically connecting to the P type source and drain regions in the second area of the driving circuit region.

There is provided a liquid crystal display device according to a further aspect of the present invention, comprising: a substrate having a first region and a second region; a N type thin film transistor in the first region having a gate electrode, a N type active pattern, and source and drain electrodes, the gate electrode having a first gate electrode and a second gate electrode surrounding the first gate electrode; and a P type thin film transistor having the gate electrode, a P type active pattern and the source and drain electrodes, the gate electrode having the first gate electrode and the second gate electrode surrounding the first gate electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

FIGS. 2A to 2F are cross sectional views sequentially illustrating a process of fabricating a thin film transistor according to a first embodiment of the present invention.

For convenience of description, a method of fabricating a N type thin film transistor is illustrated at the left of the figure, and a method of fabricating a P type thin film transistor is illustrated at the right of the figure.

Figure 1:
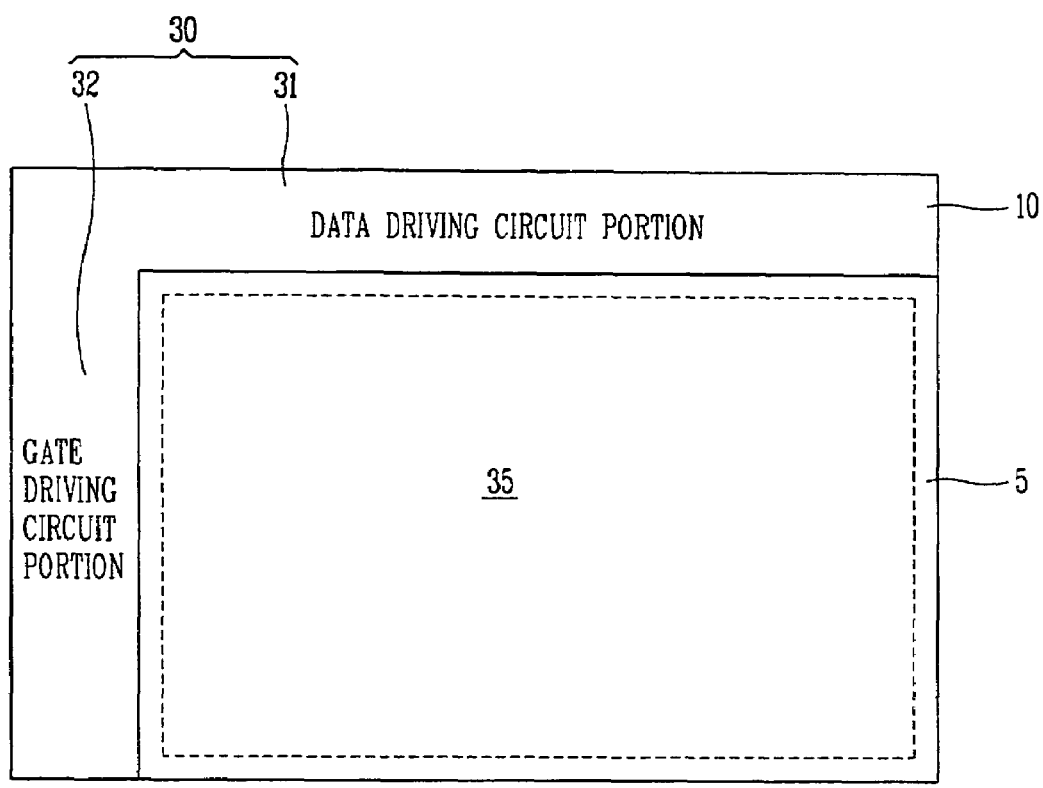
FIG. 1 is a plan view schematically illustrating a structure of a related art driving circuit integrated type liquid crystal display device.
Figure 2A:
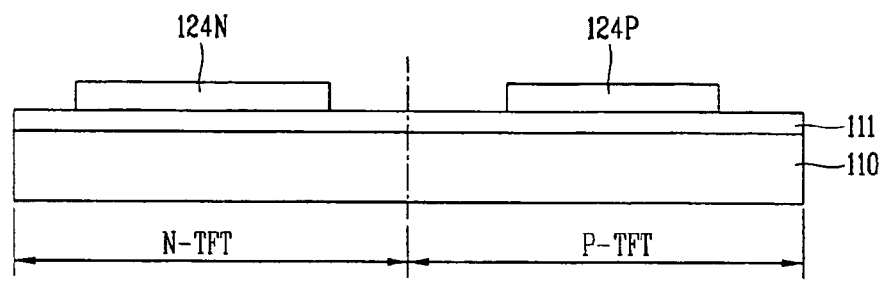
FIGS. 2A to 2F are cross sectional views sequentially illustrating a process of fabricating a thin film transistor according to a first embodiment of the present invention.

As illustrated in FIG. 2A, a buffer layer 111 formed of a silicon oxide film is formed on a substrate 110 formed of a transparent insulating material such as glass.

The buffer layer 111 serves to prevent impurities such as natrium (Na) existing in the glass substrate 100 from penetrating into an upper layer during a crystallization process.

Active patterns 124N and 124P formed of polycrystalline silicon are respectively formed in an N type thin film transistor region of and a P type thin film transistor region of the substrate 110 where the buffer layer 111 is formed.

As for the active patterns 124N and 124P, a polycrystalline silicon thin film is formed by depositing an amorphous silicon thin film on the entire surface of the substrate 110 and then crystallizing it by a crystallization method such as laser annealing. Thereafter, the crystallized polycrystalline silicon thin film is patterned through a photolithography process (a first mask process), thereby forming active patterns 124N and 124P, respectively, in the N type thin film transistor region and the P type thin film transistor region.

The photolithography process is a series of process steps of forming a desired pattern by transferring a pattern drawn on a mask onto a substrate deposited with a thin film, which includes photosensitive solution coating, exposure, and development steps.

Representative methods of depositing an amorphous silicon thin film include a low pressure chemical vapor deposition (LPCVD) method and a plasma enhanced chemical vapor deposition (PECVD) method. In the deposition of amorphous silicon thin film by the plasma enhanced chemical vapor deposition method, hydrogen atoms of about 20%, which varies more or less according to the temperature of the substrate during deposition, are included in the amorphous silicon thin film. Therefore, in the deposition of amorphous silicon thin film by the plasma enhanced chemical vapor deposition method, it is necessary to carry out a dehydrogenation process by which hydrogen atoms existing in the thin film are discharged.

As the crystallization of an amorphous silicon thin film, a variety of crystallization methods may be employed. In the employment of a laser annealing method using a laser, an eximer laser annealing (ELA) method using a pulse type laser is mainly used, but a sequential lateral solidification (SLS) method that has sharply improved the crystallization properties by growing grains in a lateral direction may be used.

The sequential lateral solidification (SLS) uses the fact that grains grow at the interface between liquid phase silicon and solid phase silicon in a direction perpendicular to the interface. It is a crystallization method which can improve the size of silicon grains by laterally growing grains to a predetermined length by properly adjusting a laser energy level and a laser beam irradiation range.

Figure 2B:
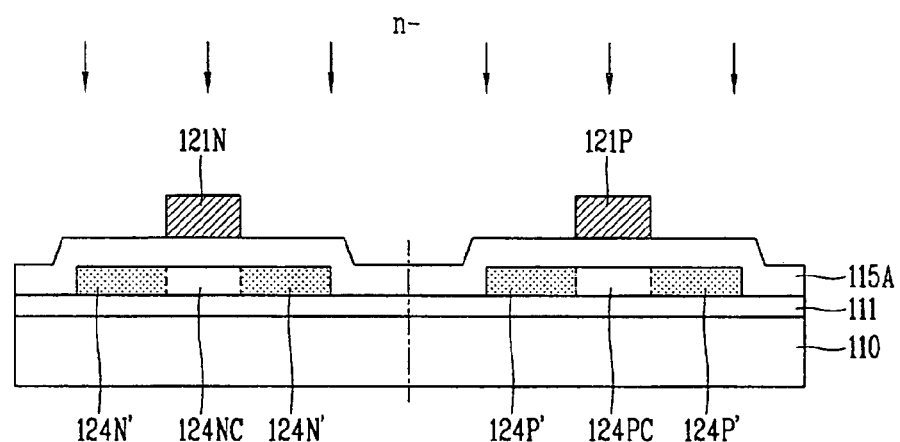

Next, as illustrated in FIG. 2B, a first insulating film 115A, a gate insulating film, is formed on the entire surface of the substrate 110 where the active patterns 124N and 124P are formed.

Thereafter, first gate electrodes 121N and 121P of an aluminum type low resistance conductive material, such as aluminum, aluminum-neodyminum (AlNd), etc., are formed above the predetermined regions (i.e., channel regions of the active patterns 124N and 124P) of the substrate 100 where the first insulating film 115A is formed.

The first gate electrodes 121N and 121P are formed using a photolithography process (a second mask process) after depositing an aluminum type conductive material on the entire surface of the substrate 110 where the first insulating film 115A is formed.

N-doping regions 124N' and 124P' are formed in predetermined regions of the left and right of the active patterns 124N and 124P of the N type thin film transistor and P type thin film transistor by doping n-impurity ions of low concentration on the entire surface of the substrate 110 where the first gate electrodes 121N and 121P are formed.

A channel region 124NC of the N type thin film transistor and a channel region 124PC of the P type thin film transistor are defined in middle regions of the active patterns 124N and 124P of the N type thin film transistor and P type thin film transistor that are shielded by the first gate electrodes 121N and 121P and not doped with n-impurity ions.

As described above, in this exemplary embodiment, an aluminum type low resistance conductive material is used as the first gate electrodes 121N and 121P in order to realize a low resistance wiring on the array substrate. There is a problem that the aluminum type wiring is etched away by a developing solution during a high concentration doping process to be described later. Hence, a high resistance wiring, such as molybdenum non-reactive to a developing solution, is used rather than the aluminum type, resulting in a problem in realizing a large size panel.

For example, for the wiring metal of the array substrate, a low resistance conductive material, such as aluminum, aluminum alloy, copper, copper alloy, etc., having a specific resistance less than a few tens×$10^{-6}$ cm$^{-1}$, is suitable for the prevention of a signal delay. Among them, aluminum or aluminum alloy is commonly used. Here, the aluminum alloy contains, in aluminum, about 5% of transition metal, such as chromium (Cr), titanium (Ti), molybdenum (Mo), uranium (Ur), tantalum (Ta), tungsten (W) and so on.

However, aluminum has a drawback in that corrosion resistance is poor and a hillock occurs during the process. In particular, there is problem that in a case where the aluminum type conductive material is used as the gate wiring, the aluminum is etched away by a developing solution during a high concentration doping process as described above.

Therefore, because the formation of wiring formed only of an aluminum layer contributes to the degradation of the properties of the device, a metal wiring of a two layer structure may be used. This double-layer structure is formed by laminating molybdenum or molybdenum alloy non-reactive to a developing solution and singularly useable as wiring on a single layer of aluminum or aluminum alloy.

But the two metal layer wiring as described above still has a problem in that the etching width of the molybdenum or molybdenum alloy on the upper part is greater than that of the aluminum type conductive material due to a difference in etching selectivity ratio of the conductive material during a batch etching of the two metal layer, parts of the aluminum type conductive material on the lower part are exposed and etched away by the developing solution.

Figure 2C:
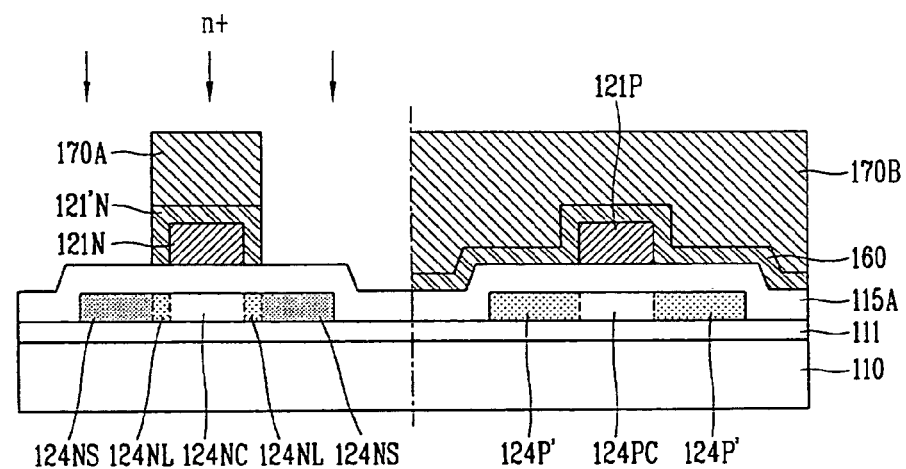
Figure 2D:
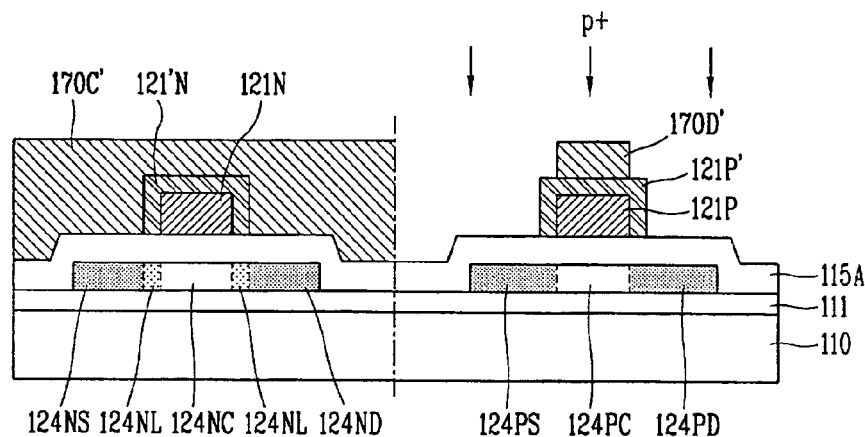

Accordingly, in the present invention, in order to solve the above problems, as illustrated in FIGS. 2C and 2D, second gate electrodes 121'N and 121'P are formed on the top of the first gate electrodes 121N and 121P in such a fashion to surround the first gate electrodes 121N and 121P such that the first gate electrodes 121N and 121P are not exposed.

In this exemplary embodiment, the second gate electrodes 121'N and 121'P can be formed without an additional mask process by simultaneously performing the patterning of a photosensitive film and the patterning of the second gate electrodes 121'N and 121'P during the doping process. This will be described in detail with reference to FIGS. 3A to 3E.

FIGS. 3A to 3E are cross sectional views concretely illustrating a third mask process and a fourth mask process according to the first embodiment of the present invention.

Figure 3A:
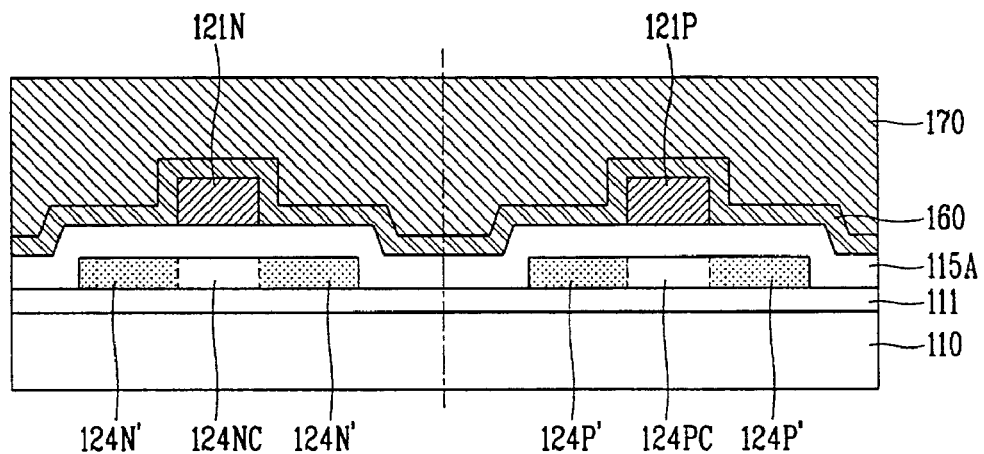
FIGS. 3A to 3E are cross sectional views illustrating a third mask process and a fourth mask process according to the first embodiment of the present invention.

As illustrated in FIG. 3A, a conductive film 160 is formed at a predetermined thickness on the entire surface of the substrate 110 where the first gate electrodes 121N and 121P are formed.

The conductive film 160 is formed of a conductive material, such as molybdenum, molybdenum alloy, titanium, chrome, etc., which is non-reactive to a developing solution and has a superior contact property with the first gate electrodes 121N and 121P of the aluminum type.

Thereafter, to manufacture a N type thin film transistor (i.e., to form N type source/drain regions on the active patterns 124N of the N type thin film transistor), a photosensitive film 170 formed of a photosensitive material such as photoresist is formed on the entire surface of the substrate 110.

Figure 3B:
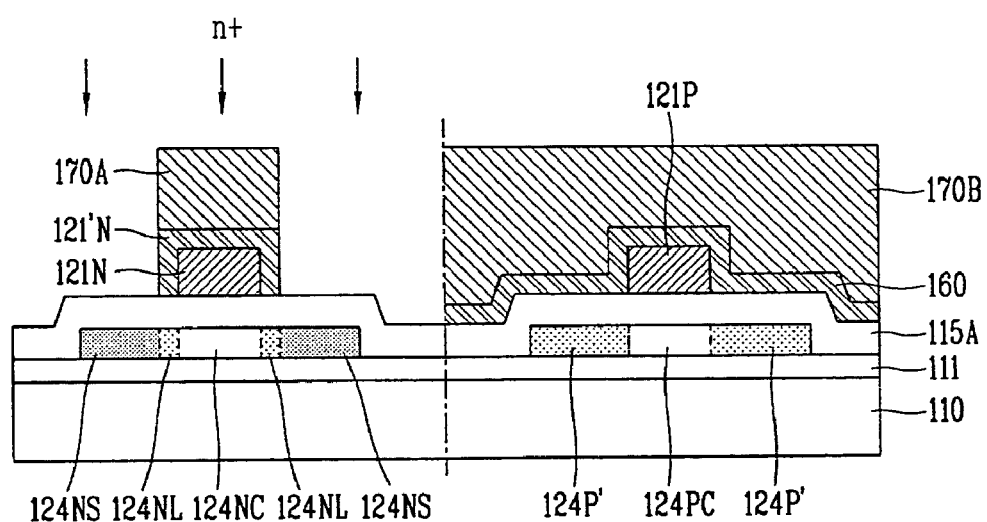

As illustrated in FIG. 3B (or FIG. 2C), the photosensitive film 170 is patterned (a third mask process) to form photosensitive film patterns 170A and 170B covering some parts of the N type thin film transistor region and the entire parts of the P type thin film transistor region. Afterwards, the conductive film 160 on the lower part is removed using the photosensitive film patterns 170A and 170B as a mask, to form a second gate electrode 121'N formed of the conductive film over the first gate electrode 121N of the N type thin film transistor.

Thereafter, with some parts of the N type thin film transistor, i.e., the second gate electrode 121'N region, being shielded by the first photosensitive film pattern 170A and the entire regions of the P type thin film transistor being shielded by the second photosensitive film pattern 170B, n+ impurity ions are implanted, thereby forming N type source/drain regions 124NS and 124ND, a resistant contact layer, in predetermined regions of the left and right of the active pattern 124N of the N type thin film transistor.

As described above, the lower conductive film 160 shielded by the first photosensitive film pattern 170A is patterned by a patterning process to define the second gate electrode 121'N of the N type thin film transistor.

Moreover, a LDD (Lightly Doped Drain) region 124NL, a channel region 124NC and a LDD region 124NL are sequentially defined, starting from the source region 124NS, between the source region 124NS and drain region 124ND of the N type thin film transistor. That is, the LDD regions 124NL of the N type thin film transistor serving as n-doping regions are defined between the source region 124NS and the channel region 124NC and between the drain region 124ND and the channel region 124NC, respectively. The LDD regions 124NL serve to reduce a leakage current when the N type thin film transistor is off.

According to the lateral width of the patterned first photosensitive film pattern 170A, the lateral width of the second gate electrode 121'N on the lower part thereof is determined, and at the same time, the width of the LDD region 124NL of the N type active pattern 124N is determined.

The source region 124NS and drain region 124ND of the N type thin film transistor are formed by implanting fifth group (Group V) elements, such as phosphorous (P), capable of electron donation.

Figure 3C:
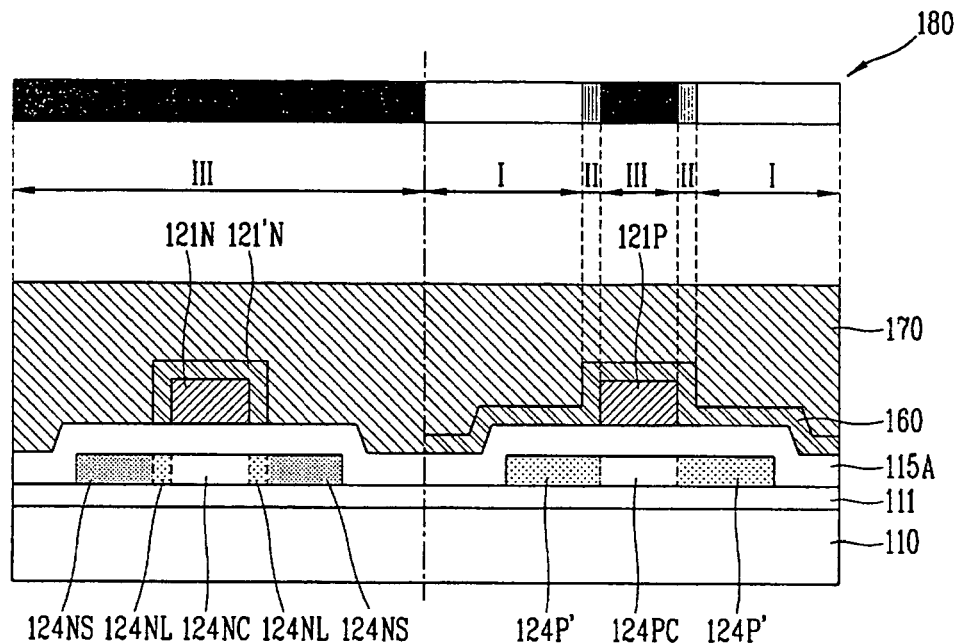

Next, to manufacture a P type thin film transistor, as illustrated in FIG. 3C, a new photosensitive film 170 is formed on the entire surface of the substrate 110.

In this embodiment, a diffraction exposure is utilized such that, by a single mask process, P type source/drain regions are formed by performing a P type doping onto the P type thin film transistor and a second gate electrode is formed on the top of a P type fist gate electrode 121P.

That is, light is irradiated through a diffraction mask 180 including a slit region onto the entire surface of the substrate 110 where the photosensitive film 170 is formed.

The diffraction mask 180 is provided with a first transmission region I for transmitting light, a second transmission region II for partially transmitting light, and a shielding region III for shielding of irradiated light. Only the light transmitted through the mask 180 is irradiated onto the photosensitive film 170.

In the diffraction mask 180 used in this embodiment, the second transmission region II has a slit structure, and the amount of exposure of light irradiated through the second transmission region II is smaller than the amount of exposure of light irradiated onto the first transmission region I for transmitting light. Thus, if the photosensitive film 170 is exposed and developed using the mask 180 partially provided with a slit region II after the formation of the photosensitive film 170, the thickness of the photosensitive film left in the slit region II and the thickness of the photosensitive film left in the first transmission region I or the shielding region III becomes different.

Where a positive type photoresist is used as the photosensitive film 170, the thickness of the photosensitive film left in the slit region II becomes thinner than the thickness of the photosensitive film left in the shielding region III. By contrast, when using a negative type photoresist, the thickness of the photosensitive film left in the slit region II becomes thinner than the thickness of the photosensitive film left in the first transmission region I.

Although a positive type photoresist is used in this embodiment it is only as an example. The present invention is not limited to this. By way of further example, a negative type photoresist also may be used.

Figure 3D:
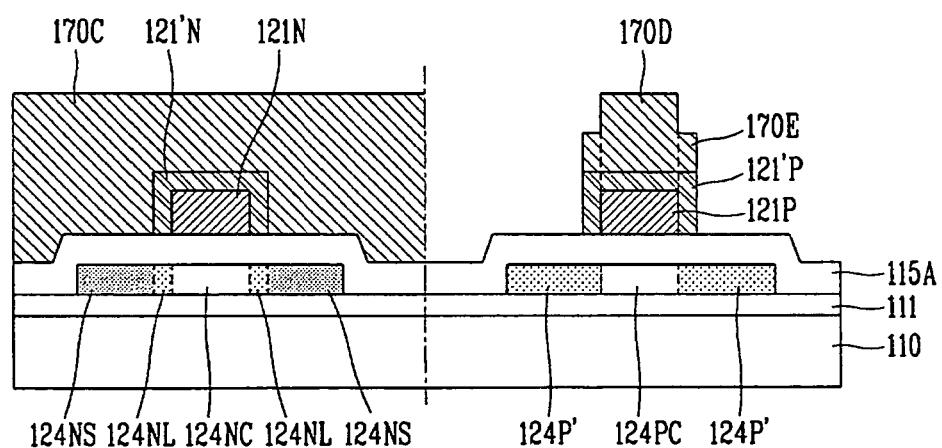

Continually, after developing the photosensitive film 170 exposed through the diffraction mask 180 (a fourth mask process), as illustrated in FIG. 3D, photosensitive film patterns 170C to 170E having a predetermined thickness are left in the regions where every light is shielded through the shielding region III or parts of light are shielded through second transmission region II, and the photosensitive film in the first transmission region I through every light is irradiated is removed to thus expose the surface of the conductive film 160.

The third photosensitive film pattern 170C and fourth photosensitive film pattern 170D formed through the shielding region III are formed thicker than the fifth photosensitive film pattern 170E formed in the second transmission region II.

That is, the third photosensitive film pattern 170C of a first thickness is left in the entire part of the N type thin film transistor region, the fourth photosensitive film pattern 170D of the first thickness is left on the top of the first gate electrode 121P of the P type thin film transistor, and the fifth photosensitive film pattern 170E of a second thickness is left on the top of predetermined regions of the left and right of the first gate electrode 121P.

Although the fourth photosensitive film pattern 170D has the same width as the P type first gate electrode 121P in this embodiment, the present invention is not limited thereto, but the width of the fourth photosensitive film pattern 170D needs only to be narrower or the same as the thickness of photosensitive film left in the first transmission region I.

Thereafter, using the photosensitive film patterns 170C to 170E thus formed as a mask, the conductive film 160 on the lower part thereof is selectively removed to form a second gate electrode 121'P formed of the conductive film over the first gate electrode 121P of the P type thin film transistor.

That is, the conductive film 160 at the lower part shielded by the fourth photosensitive film pattern 170D and the fifth photosensitive film pattern 170E is patterned through a patterning process, thereby defining the second gate electrode 121'P of the P type thin film transistor.

As described above, according to the lateral width of the patterned fifth photosensitive film pattern 170E, the lateral width of the second gate electrode 121P on the lower part thereof is determined.

Figure 3E:
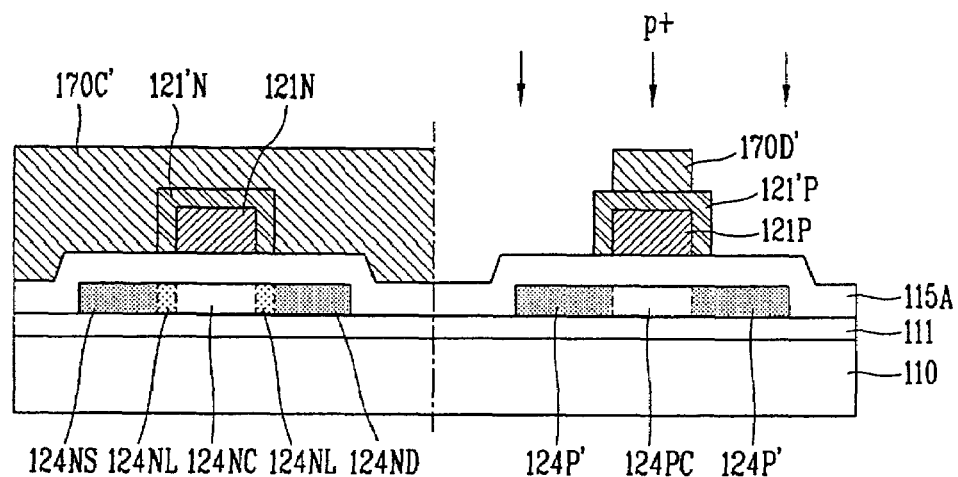

When the fifth photosensitive film pattern 170E formed in the second transmission region II is completely removed by an ashing process, as illustrated in FIG. 3E (or FIG. 2D), the third photosensitive film pattern 170C in the N type thin film transistor region and the fourth photosensitive film pattern 170D in the P type thin film transistor region are left as a sixth photosensitive film pattern 170C' of and a seventh photosensitive film pattern 170D' of a third thickness by being removed to the thickness of the fifth photosensitive film pattern 170E of the second transmission region II.

Afterwards, with the entire part of the N type thin film transistor region being shielded by the sixth photosensitive film pattern 170C' and the first gate electrode 121P region of the P type thin film transistor being shielded by the seventh photosensitive film pattern 170D', p+ impurity ions of high concentration are doped on the entire surface of the substrate 110, thereby forming a source region 124PS of and a drain region 124PD of P type in predetermined regions of the left and right of the active pattern 124P of the P type thin film transistor.

At this time, the n-doping regions 124P' of the P type thin film transistor formed by the n-doping process is changed into p+ doping regions, that is, a source region 124PS of and a drain region 124PD of P type, by doping p+ ions of high concentration. The second gate electrode 121'P of the P type thin film transistor has a much thinner width than the first gate electrode 121P such that the p+ impurity ions may be implanted into the active pattern 124P on the lower part via the second gate electrode 121'P.

The source/drain regions 124PS and 124PD of the P type thin film transistor are formed by implanting third group (Group III) elements, such as boron (B), capable of hole donation.

As descried above, in this embodiment, the etching problem of the first gate wiring caused by a developing solution can be solved by forming the first gate wiring of a low resistance conductive material on the lower part and forming the second gate wiring on the upper part in such a fashion to be non-reactive to the developing solution and surround the first gate wiring.

No additional mask process is required because the second gate electrodes are formed by being patterned simultaneously with the patterning of the photosensitive film during the doping process. As a result, it is less costly.

Although this embodiment is illustrated by an example in which a N type thin film transistor is firstly manufactured by carrying out a N doping and then a P type thin film transistor is manufactured by carrying out a P doping, the results are the same if the N doping and the P doping are carried out in a reverse order.

Figure 2E:
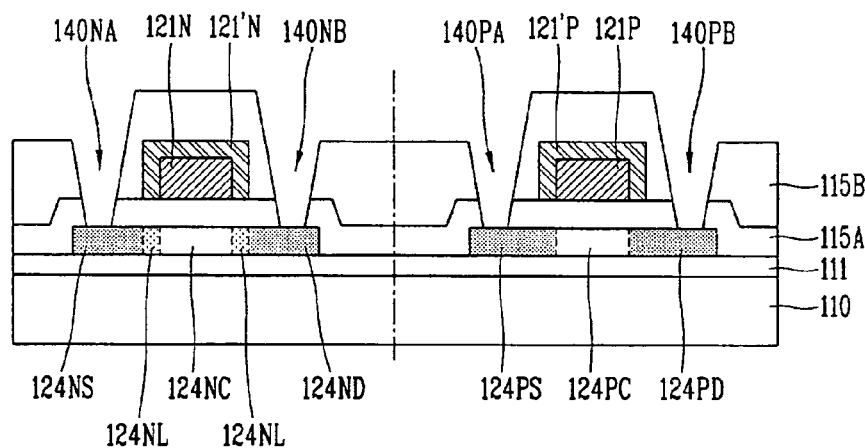

Next, as illustrated in FIG. 2E, a second insulating film 115B, an interlayer insulating film, is formed on the entire surface of the substrate 110, and then the second insulating film 115B and the first insulating film 115A are selectively patterned by a photolithography process (a fifth mask process), thereby forming a first contact hole 140NA partially exposing the source region 124NS of the N type thin film transistor and a second contact hole 140NB partially exposing the drain region 140ND thereof and forming a third contact hole 140PA partially exposing the source region 124PS of the P type thin film transistor and a fourth contact hole 140PN partially exposing the drain region 124PD thereof.

The second insulating film 115B may be formed of an inorganic insulating film, such as a silicon oxide film or silicon nitride film, or may be formed of an organic insulating film, such as benzocyclobutene (BCB) or acryl, having a low dielectric constant in order to realize a high aperture ratio.

Figure 2F:
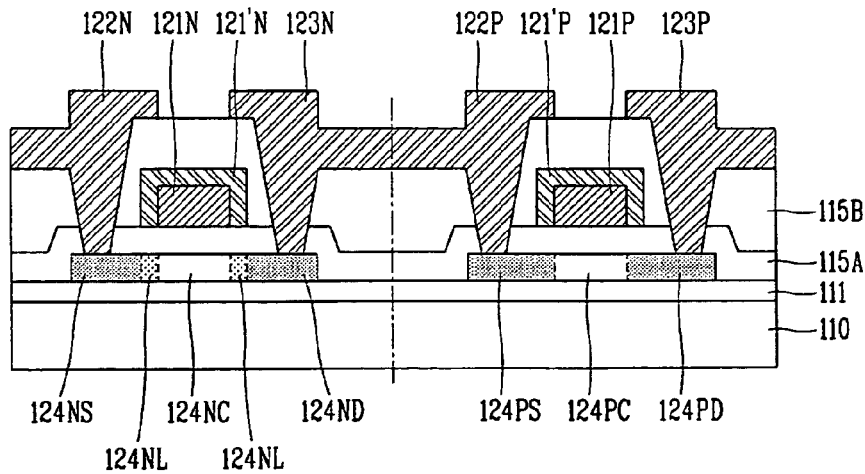

As illustrated in FIG. 2F, a source electrode 122N electrically connecting to the N type source region 124NS via a first contact hole 140NA and a drain electrode 123N electrically connecting to the drain region 124ND via a second contact hole 140NB are formed in the N type thin film transistor region by a photolithography process (a sixth mask process). And a source electrode 122P electrically connecting to the P type source region 124PS via a third contact hole 140PA and a drain electrode 123P electrically connecting to the drain region 124PD via a fourth contact hole 140PB are formed in the P type thin film transistor region.

As described above, it is possible to carry out an N type doping onto the N type thin film transistor and form a second gate electrode over the N type first gate electrode by a single mask process, and carry out a P type doping onto the P type thin film transistor and form a second gate electrode over the P type first gate electrode by another mask process. At this time, the second gate electrode may be formed in a clad structure completely surrounding the first gate electrode.

The present invention is applicable regardless of the conductive material of the first gate wiring and second gate wiring only if the first gate wiring is formed of a low resistance conductive material on the lower part and the second gate wiring is formed in such a fashion as to be non-reactive to a developing solution and to surround the first gate wiring. The present invention is also applicable to a structure of more than three layers as well as the above gate wiring of the two layer structure.

Moreover, the second gate wiring may be formed in any shape only if it surrounds the first gate wiring so that the first gate wiring is not exposed to a developing solution. An example of constructing the second gate wiring in a different shape from that of the first embodiment will be described in detail in a second embodiment.

Figure 4:
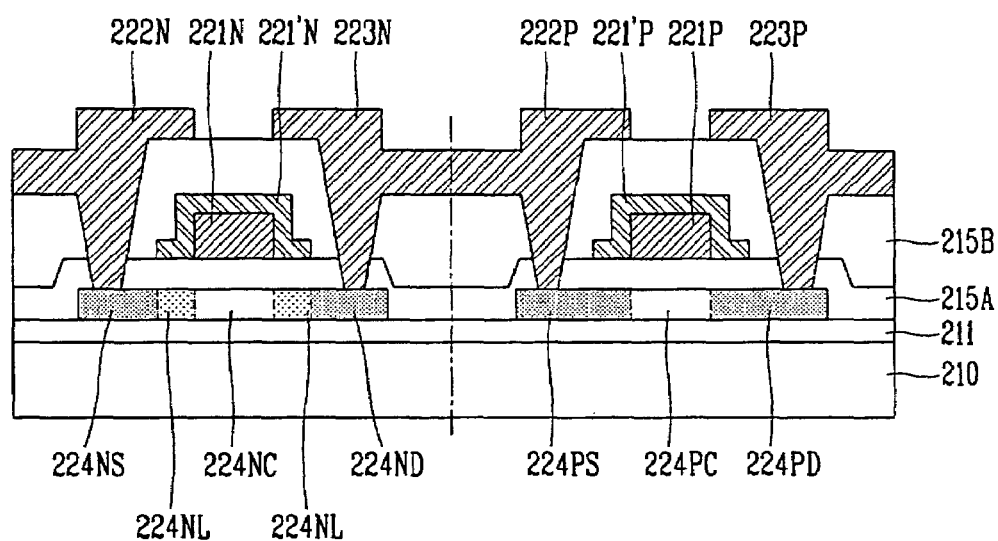
FIG. 4 is a cross sectional view schematically illustrating a thin film transistor according to a second embodiment of the present invention.

FIG. 4 is a cross sectional view schematically illustrating a thin film transistor according to a second embodiment of the present invention. An N type thin film transistor is illustrated on the left side of the drawing and a P type thin film transistor is illustrated on the right side of the drawing by way of example.

As illustrated therein, a N type thin film transistor and a P type thin film transistor having active patterns, gate electrodes 221N and 221'N and 221P and 221'P and source/drain electrodes 222N and 222P and 223N and 223P are formed on a substrate 210 where a buffer layer 211 is formed.

The active pattern of the N type thin film transistor having a source region 224NS, LDD regions 224NL, a channel region 224NC and a drain region 224ND, while the active pattern of the P type thin film transistor having a source region 224PS, a channel region 224PC and a drain region 224PD. Although this embodiment is illustrated by an example in which the LDD regions 224NL are formed on the active pattern of the N type thin film transistor, the present invention is not limited thereto, but also may be applicable to an N type thin film transistor of a general structure where no LDD region is defined.

The gate electrodes 221N and 221'N or 221P and 221'P are comprised of a first gate electrode 221N or 221P of a low resistance and a second gate electrode 221'N or 221'P formed of a conductive material non-reactive to a developing solution. The second gate electrode 221'N and 221'P are formed over the first gate electrodes 221N and 221P in such a fashion to surround the first gate electrodes 221N and 221P, thereby forming an etching problem of the first gate electrodes 221N and 221P caused by a developing solution.

In particular, the second gate electrodes 221'N and 221'P of this embodiment are advantageous in that their profile is better than those in the first embodiment because they have a tapered shape in which the left and right edges are partially protruded. At this time, the width of the LDD regions 224NL of the N type thin film transistor is determined by the protruded left and right edges of the second gate electrode 221'N, and the channel regions 224NC and 224PC of the N type thin film transistor and P type thin film transistor are defined by the first gate electrodes 221N and 221P.

As described from above, the liquid crystal display device of the first and second embodiments can prevent the first gate electrodes from being etched by reaction with a developing solution during a doping process by forming second gate electrodes over the first gate electrodes in such a fashion as to surround the first gate electrodes using a conductive material, such as aluminum, having a low resistance and non-reactive to a developing solution.

In particular, a large area panel can be achieved because gate wiring can be formed of a low resistance conductive material. Defects, such as hillock, do not occur because the conductive material, such as molybdenum, molybdenum alloy, titanium or chrome, comprising the second gate electrodes is superior in thermal stability.

Moreover, there is an advantage that no additional mask process is required, because the second gate electrodes are formed by being patterned simultaneously with the patterning of a photosensitive film during a doping process.

As described above, the liquid crystal display device and the method of fabricating the same of the present invention provide the effect of manufacturing a large size panel with a driving circuit since a low resistance wiring can be formed. The manufacturing cost may be reduced because no additional mask process is required by forming the second gate wiring of the gate wiring by utilizing a photosensitive film patterning step of a doping process.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    providing a substrate having a first region and a second region;
    forming active patterns in the first and second regions;
    forming a first insulating film on the substrate;
    forming a first gate electrode of a first conductive material on the active patterns;
    forming a conductive layer of the second conductive material on the substrate;
    forming a first photosensitive film on the conductive layer;
    forming a first photosensitive film pattern by patterning the first photosensitive film to surround portions having the first gate electrode of the first region and forming a second photosensitive film pattern to shield an entire portion of the second region;
    forming a second gate electrode on the first gate electrode of the first region by patterning the conductive layer using the photosensitive film patterns as a mask;
    forming source and drain regions of N type on the active pattern of the first region by doping n+ impurity ions on the substrate using the first and second photosensitive film patterns as a mask;
    forming a second photosensitive film on the substrate;
    forming a third photosensitive film pattern having a first thickness on the first region, a fourth photosensitive film pattern having the first thickness on the first gate electrode of the second region, and a fifth photosensitive film pattern having a second thickness on the side of the first gate electrode of the second region using a mask having a diffraction pattern;
    forming a second gate electrode on the first gate electrode of the second region by patterning the conductive layer using the third, fourth and fifth photosensitive film patterns as a mask;
    removing the fifth photosensitive film pattern;
    forming source and drain regions of P type on the active pattern of the second region by doping p+ impurity ions on the substrate using the third and fourth photosensitive film patterns as a mask;
    forming a second insulating film on the substrate; and
    forming N type source and drain electrodes electrically connected to the N type source and drain regions in the first region and P type source and drain electrodes electrically connected to the P type source and drain regions in the second region.

2. The method of claim 1, wherein n– doping regions are formed in predetermined regions of the active patterns by doping n- impurity ions on the substrate after forming the first gate electrode.

3. The method of claim 1, wherein the fifth photosensitive film pattern is formed on left and right sides of the first gate electrode of the second region.

4. The method of claim 1, wherein the mask having the diffraction pattern includes a first transmission region substantially entirely transmits light, a second transmission region partially transmits a light and a shielding region shields a light.

5. The method of claim 4, wherein the photosensitive film is a positive type photosensitive film.

6. The method of claim 5, wherein the second gate electrode is formed on the first gate electrode of the second region using the second transmission region of the mask on predetermined regions of the left and right sides of the first gate electrode of the second region.

7. The method of claim 1, wherein the second thickness of the fifth photosensitive film pattern is thinner than the first thickness of the third and fourth photosensitive patterns using the second transmission region of the mask having the diffraction pattern.

8. The method of claim 1, wherein the fifth photosensitive film pattern is removed by an ashing process, and the third and fourth photosensitive film patterns remain a third thickness.

9. The method of claim 8, wherein the third thickness is removed to the second thickness of the fifth photosensitive film pattern.

10. The method of claim 1, wherein a width of the fourth photosensitive film pattern is narrower or the same as that of the first gate electrode of the second region.

11. The method of claim 1, wherein the first conductive material includes low resistance conductive material.

12. The method of claim 1, wherein the first conductive material includes one of aluminum and aluminum alloy.

13. The method of claim 1, wherein the second conductive material includes one of molybdenum and molybdenum alloy.

14. The method of claim 1, wherein the second gate electrode surrounds the first gate electrode.

15. The method of claim 14, wherein the first gate electrode is unexposed to a developer during a doping process.

16. The method of claim 1, wherein the second gate electrode has a tapered shape.

17. The method of claim 16, wherein the left and right edges of the second gate electrode are partially protruded.

18. The method of claim 1, further comprising forming a first contact hole, a second contact hole, a third contact hole, and a fourth contact hole by removing portions of the second insulating film and the first insulating film after forming the second insulating film.

19. The method of claim 18, wherein the first contact hole partially exposes the N type source region in the first region.

20. The method of claim 19, wherein the N type source region is electrically connected to the N type source electrode via the first contact hole.

21. The method of claim 18, wherein the second contact hole partially exposes the N type drain region in the first region.

22. The method of claim 21, wherein the N type drain region is electrically connected to the N type drain electrode via the second contact hole.

23. The method of claim 18, wherein the third contact hole partially exposes the P type source region in the second region.

24. The method of claim 23, wherein the P type source region is electrically connected to the P type source electrode via the third contact hole.

25. The method of claim 18, wherein the fourth contact hole partially exposes the P type drain region in the second region.

26. The method of claim 25, wherein the P type drain region is electrically connected to the P type drain electrode via the fourth contact hole.

27. A liquid crystal display device, comprising:
a substrate having a first region and a second region;
a N type thin film transistor in the first region having a gate electrode, a N type active pattern, and source and drain electrodes, the gate electrode having a first gate electrode and a second gate electrode surrounding the first gate electrode,
wherein the N type active pattern includes n+ doped source and drain regions, n− doped LDD regions and an undoped channel region,
wherein the undoped channel region is defined by a width of the first gate electrode of the first region, and
wherein the n− doped LDD regions are defined by a lateral width of the second gate electrode of the first region and the n− doped LDD regions are located between the n+ doped source/drain regions and the undoped channel region; and
a P type thin film transistor having the gate electrode, a P type active pattern and the source and drain electrodes, the gate electrode having the first gate electrode and the second gate electrode surrounding the first gate electrode.

28. The device of claim 27, wherein the first gate electrode is formed of low resistance conductive material.

29. The device of claim 27, wherein the first gate electrode is formed of one of aluminum and aluminum alloy.

30. The device of claim 27, wherein the second gate electrode is formed of one of molybdenum and molybdenum alloy.

31. The device of claim 27, wherein the second gate electrode has a tapered shape.

32. The device of claim 31, wherein the left and right edges of the second gate electrode are partially protruded.

33. The device of claim 27, wherein the P type active pattern includes p+ doped source and drain regions and a channel region.

34. The device of claim 33, wherein the channel region of the active pattern is defined by a width of the first gate electrode.

35. The device of claim 27, wherein the P type thin film transistor is formed on the same layer of the second region corresponding to the gate electrode, the active pattern and the source and drain electrodes of the first region.

* * * * *